United States Patent [19]

Ogura

[11] 4,105,212
[45] Aug. 8, 1978

[54] REPRODUCING STYLUS FOR PHONOGRAPH RECORDS

[75] Inventor: Junshiro Ogura, Tokyo, Japan

[73] Assignee: Ogura Jewel Industry Co., Ltd., Japan

[21] Appl. No.: 724,757

[22] Filed: Sep. 20, 1976

[30] Foreign Application Priority Data

Sep. 23, 1975 [JP] Japan .............................. 50-114324

[51] Int. Cl.² .............................................. G11B 3/44
[52] U.S. Cl. ................................................... 274/38
[58] Field of Search ......................................... 274/38

[56] References Cited

U.S. PATENT DOCUMENTS

| 2,251,204 | 7/1941 | Reid ........................................ 274/38 |
| 3,534,968 | 10/1970 | Puleston ................................. 274/38 |

FOREIGN PATENT DOCUMENTS

| 555,675 | 9/1943 | United Kingdom ...................... 274/38 |
| 768,414 | 2/1957 | United Kingdom ...................... 274/38 |

Primary Examiner—Richard E. Aegerter
Assistant Examiner—John W. Shepperd
Attorney, Agent, or Firm—McGlew and Tuttle

[57] ABSTRACT

An improved stylus, capable of following more faithfully not only horizontal and vertical vibrations but also 45° vibrations, has an operative portion, for contacting the sound grooves, defined at any point thereof by the relationship that the projections of the operative portion onto the horizontal plane in respect to the axis of the stylus is part of an ellipse having a major diameter in which 0 is the angle between the horizontal plane and the line connecting the point and the center of curvature at the point, and r is the minor radius of the ellipse.

11 Claims, 20 Drawing Figures

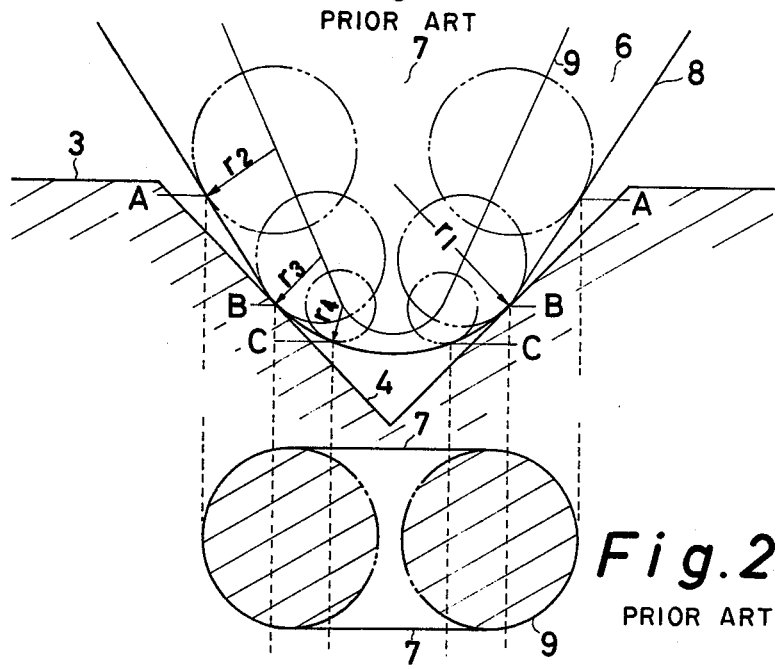
Fig. 2
PRIOR ART
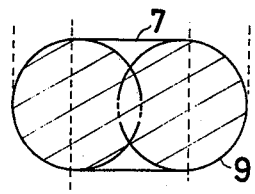
Fig. 2A
PRIOR ART
Fig. 2B
PRIOR ART
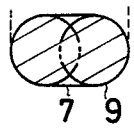
Fig. 2C
PRIOR ART
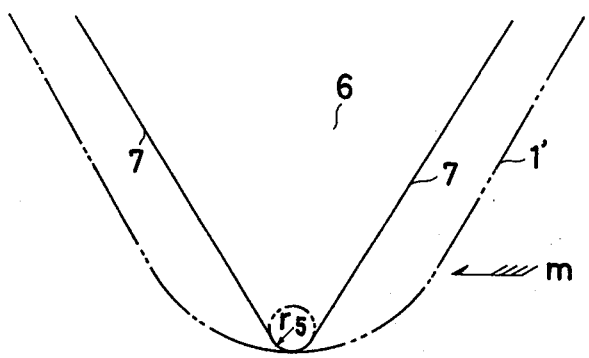
Fig. 2D
PRIOR ART

REPRODUCING STYLUS FOR PHONOGRAPH RECORDS

FIELD AND BACKGROUND OF THE INVENTION

This invention relates to a reproducing stylus for phonograph records, and, in particular, to a new and useful stylus with a novel outer shape which can follow, with high fidelity, the vibrations in the 45° direction as well as vibrations in the vertical and horizontal directions in grooves of a phonograph record.

DESCRIPTION OF THE PRIOR ART

Reproducing styli for phonograph records have been hitherto improved in an attempt to improve the reproduction characteristics with high tone quality. The shape in the tip portion of the stylus, in order to follow faithfully grooves of the phonograph records, which have been improved up to now, are roughly classified into circular styli, elliptical styli and modified styli in the representative and practical styli now in use.

Grooves in a record are cut by a cutter having a "V" shape, in accordance with the change in magnitude of the vibration, and the length of the wavelength is based on the amplitude and frequency of the recording signals. The direction of vibration in the grooves, in monaural records, is only horizontal while, in stereophonic records, composite signals, with vertical vibration, are cut in the groove following the development of stereophonic records with the 45—45 system.

In the general record disc of 30 cm designed to rotate at 33 ⅓ rpm, the circumferential speed in the innermost groove is about 209 mm/sec so that, if the maximum frequency to be recorded is 15 KHz for stereophonic recording, the wavelength to be cut in the sound grooves becomes 0.014 mm, while, for 4 channel stereophonic recording, the maximum recorded frequency comes up to 45 KHz, so that the wavelength becomes, accordingly, 0.0046 mm.

Accordingly, although consideration for the section of the tip portion of stylus is, in the case of a monaural record, only directed to the section in the horizontal direction, in stereophonic recording or four channel recording, the section in the vertical direction of the tip portion of stylus also must be taken into account in order to satisfy the above conditions.

Conventional styli, however, have disadvantages in that the vertical vibration may be not faithfully followed due to the radii of curvature of the contacting surface in a direction perpendicular to the record disc increasing toward the lower end of the tip, as mentioned hereinafter. Moreover, for 45° vibration in four channel recording, the radius of curvature at the point of contact is required to be decreased, but is rather larger, in conventional styli, as the contact point approaches toward the lower end, so that it is impossible to reproduce with high fidelity, or to obtain good balance of acoustic reproduction characteristics because of the radii of curvature with respect to 45° inclination being not symmetrical.

SUMMARY OF THE INVENTION

The object of the invention is, accordingly, to provide an improved reproducing stylus for a phonograph record which has high fidelity acoustic reproduction characteristics not only for vibrations in the 45° direction, but also for vibrations in the horizontal and vertical directions.

Another object of the invention is to provide a stylus having a construction in which the projections of the shape, at any point of the operative portion which contacts grooves, onto the horizontal plane and vertical plane in respect of the axis of stylus are both formed as a part of an ellipse of which the major diameter passes through the point on the sectional plane and toward or in parallel to the axis of the stylus, respectively.

Another object of the invention is to provide a stylus of a construction such that the sectional shapes in horizontal and vertical planes, with respect to the axis of the stylus, at any points of the operative portion for contacting grooves, where spaced angularly equally from the line connecting the center of the curvature of the operative portion and a point of the operative portion is 45° from the horizontal plane, are the same, respectively, for both the horizontal shape and the vertical shape.

A further object of the present invention is to provide a stylus having the same curvature, within the operative portion to contact the grooves, regardless of inclination of the stylus.

For an understanding of the principles of the invention, reference is made to the following description of typical embodiments thereof as illustrated in the accompanying drawings.

BRIEF DESCRIPTION OF THE DRAWINGS

In the Drawings:

FIG. 2 is an enlarged elevational view of a conventional elliptical stylus as engaged in a record groove shown in section;

FIGS. 2A, 2B and 2C are sectional view taken along the lines A—A, B—B and C—C of FIG. 2;

FIG. 2D is a side view corresponding to FIG. 2;

DESCRIPTION OF THE PREFERRED EMBODIMENTS

In order to facilitate understanding of the present invention, prior to explanation thereof, conventional styli will be discussed first.

Figure 1:
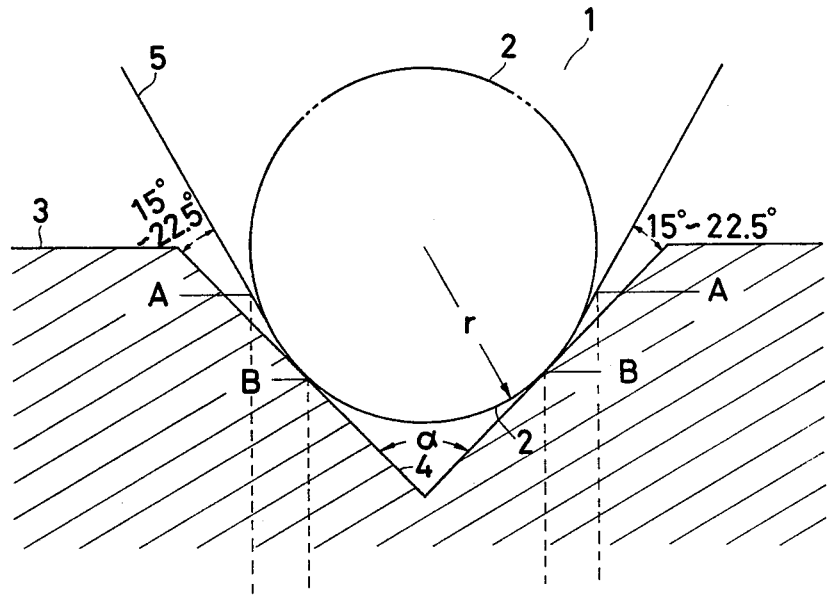
FIG. 1 is an enlarged elevational view of a conventional circular stylus as engaged in a record groove shown in section.
Figure 1A:
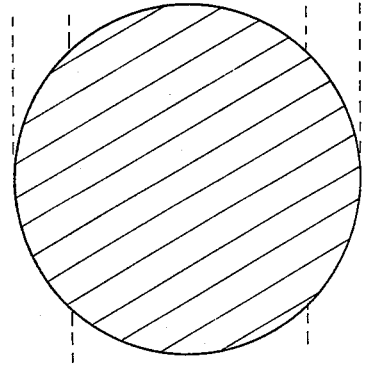
FIGS. 1A and 1B are sectional views taken along the lines A—A and B—B of FIG. 1, respectively.
Figure 1B:
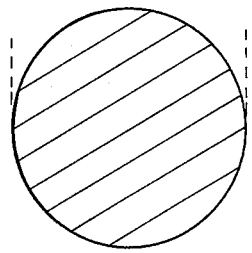

FIGS. 1 show a conventional so-called "circular stylus" in which the stylus 1 has a shape such that the spherical surface 2, for contacting the groove 4 in the record 3, has a radius $r$, and the surface 5 of the circular cone, which is smaller in angle by about 30° to 45° than the angle $\alpha$ formed by the walls of the groove 4' is inscribed by the spherical surface 2.

FIGS. 2 show a conventional "elliptical stylus" in which the stylus 6 has a shape such that there are provided two plane surfaces, or curved surfaces 7,7 approximately a plane, which surfaces intersect each other at substantially a right angle in the plane perpendicular to the longitudinal or circumferential direction $m$ of the groove 4 of the record 3, as shown in FIGS. 2 and 2D, and that the edges 9 formed by the two surfaces 7,7 and the circular portion 8 are so cut, as shown in FIG. 2A, as to be inscribed by the circles having the radii $r2$ to $r5$ which have the relation $r2 > r3 > r4 > r5$. FIGS. 2A, 2B and 2C show the sections taken along the lines A—A, B—B, and C—C, respectively.

Figure 3:
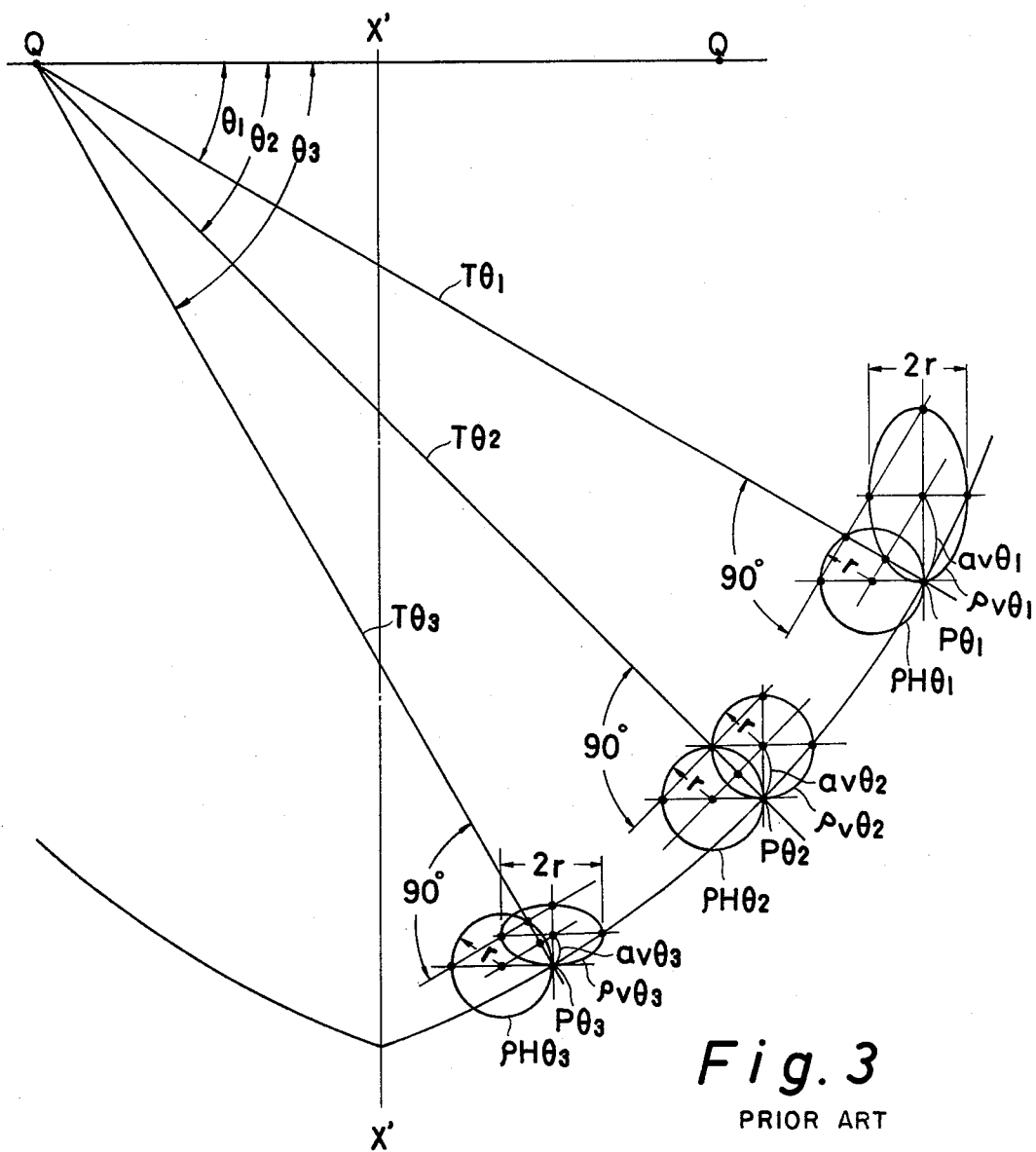
FIG. 3 is a diagrammatic view of a conventional modified stylus, showing the radii of curvature in both the horizontal and vertical sections of the portion which contacts the grooves of a record disc.

FIG. 3 shows a representative modified stylus, as shown in Japanese Publication No. 4410/1972, for example, in which $\rho H\theta$ show the radii of curvature, in the respective points P$\theta$ in the horizontal planes, in respect of the center axis of the stylus, and $\rho V\theta$ indicate the radii of curvature in the vertical planes at the points P$\theta$. As is apparent from the drawing, the radii of curvature in the horizontal direction, that is, $\rho H\theta_1$, $\rho H\theta_2$ and $\rho H\theta_3$ are the same, $r$, while the curvature in the vertical direction, parallel to the axis of the stylus body, decreases toward the lower end of the stylus, that is, the radii of curvature increase toward the lower end. This conventional modified stylus is effective to reproduce horizontal vibrations in the record groove but the stylus cannot faithfully follow the groove, to reproduce vertical vibrations, for the following reasons.

In the sectional shape in the vertical direction $\rho v\theta$, assuming that the angle between the plane perpendicular to the tangential line at the point P$\theta$ and the circumferential direction of the grooves, and the plane perpendicular to the axis of the stylus, is $\theta$, the length $av\theta$ at the point P$\theta$ is given by $$av\theta = r/\tan\theta$$

so that the sectional shape in the vertical direction at the point P$\theta$ becomes an ellipse with the major diameter of $2r (1/\tan\theta)$ and the minor diameter of $2r$. Accordingly, the following relationship is established; $av\theta_1 > av\theta_2 > av\theta_3 > av\theta_n$. Assuming that $\theta_2$ is equal to 45° in the drawing, if the point P$\theta_x$ goes beyond the point P$\theta_2$, tan $\theta$ is larger than 1.0 so that the sectional shape P$\theta_3$ in the vertical direction becomes the vertex (arc) of the minor diameter in the ellipse. The radius of curvature $\rho v\theta$ at the point P$\theta$ is given by $$\rho v\theta = r^4\tan^2\theta \left( \frac{X^2}{r^4\tan^4\theta} + \frac{1 - \frac{X^2}{r^2\tan^2\theta}}{r^2} \right)^{1.5} \quad (1)$$

in which $$x = r/\tan\theta; \ldots \quad (2)$$

$x$ is equal to $av\theta$, that is, the distance between the center of the ellipse and the point P$\theta$. $\rho v\theta$ is, therefore, obtained by the equations (1) and (2) as follows:

$$\rho v\theta = r \tan\theta \ldots \text{TM} \quad (3)$$

Accordingly, the relationship for the radii of the curvature in the vertical direction is as follows:

$$\rho v\theta_1 < \rho v\theta_2 < \rho v\theta_3 < \rho v\theta_n.$$

Figure 4:
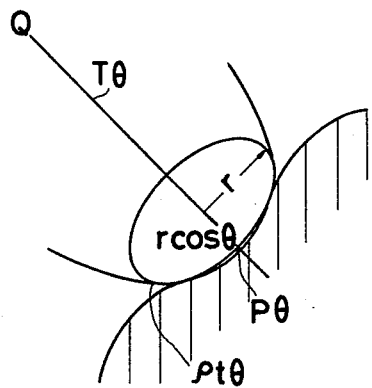
FIG. 4 illustrates the radius of curvature in a section taken along the plane $T\theta$ of FIG. 3.
Figure 7:
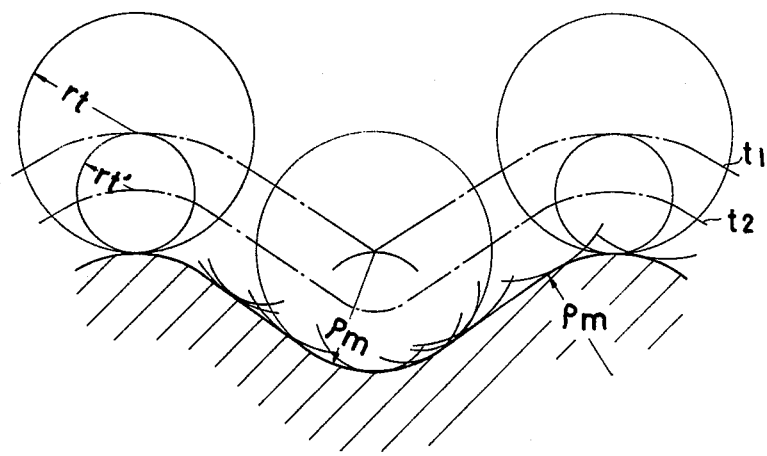
FIG. 7 illustrates the tracing of spheres, having different radii, in the case of rolling along a record groove.

Thus, it is impossible, as will be apparent from FIGS. 4 and 7, to reproduce faithfully the vibration of the grooves.

Next, considering the case of a stereophonic record or a four-channel record, the vibrations at 45° inclination with respect to the center line of the cross-section of the groove are recorded with vectoral division for four-channel recording. Therefore, it is necessary, in order to reproduce more faithfully the vibration in the 45° direction, that the radius of curvature P$t$ of the section in the 45° direction decreases. The sections in the planes T$\theta$, which are parallel to the forward direction of the groove, and which include the line connecting the center of radius of curvature Q and the point P$\theta$, become the shape as shown in FIG. 4, the minor diameter ($2a\theta$) being $r\cos\theta$ so that the diameter decreases in proportion to $\cos\theta$. The radius of curvature $\rho t\theta$ at the point P$\theta$ is, in this case, given by $$\rho v\theta = r^2\cos^2\theta \left( \frac{1}{r^2} \cdot \frac{X'^2}{r^4\cos^4\theta} - \frac{X'^2}{r^4\cos^2\theta} \right)^{1.5} \quad (4)$$

$$X' = a\theta = r\cos\theta \ldots \quad (5)$$

and thus leads to the following relationship from the equations (4) and (5):

$$\rho t\theta = r/\cos\theta \ldots \quad (6)$$

Accordingly, the following relationships are obtained;

$$a\theta_1 > a\theta_2 > a\theta_3 > a\theta_n,$$

and, for the radii of curvature, $$\rho t\theta_1 < \rho t\theta_2 < \rho t\theta_3 < \rho t\theta_n$$

In this case, the reproduction is accordingly not so faithful. Moreover, since the center axis of the stylus is not always at a right angle to the surface of the record disc, the balance of acoustic characteristics cannot be kept due to the difference in radii of the opposite ends of the stylus which contact the groove of the record disc.

Figure 5:
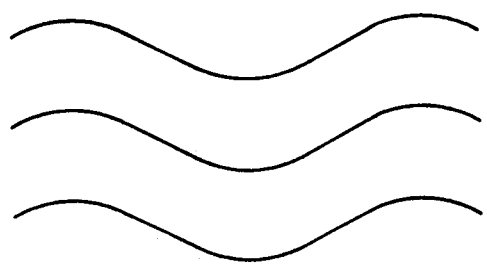
FIG. 5 is an enlarged plan view showing the groove for horizontal vibration.
Figure 5A:
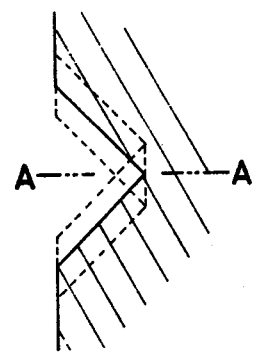
FIG. 5A is a sectional view of the groove shown in FIG. 5.
Figure 5B:
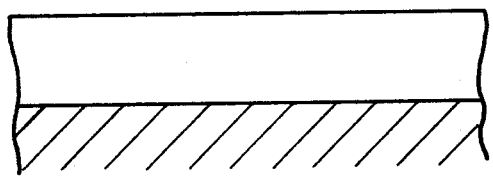
FIG. 5B is a sectional view taken along the line A—A of FIG. 5A.
Figure 6:
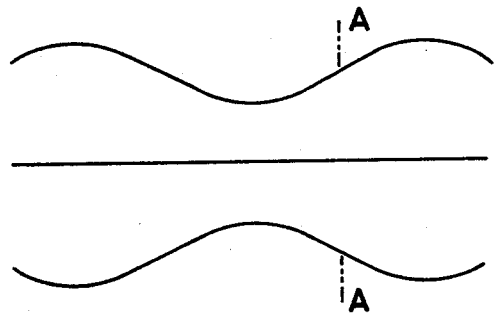
FIG. 6 is an enlarged plan view of a groove for vertical vibration.
Figure 6A:
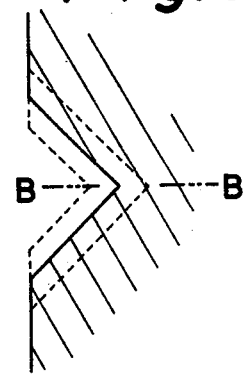
FIG. 6A is a sectional view taken along the line A—A of FIG. 6.
Figure 6B:
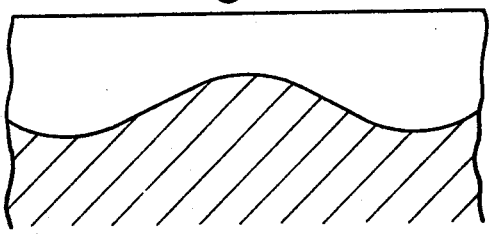
FIG. 6B is a sectional view taken along the line B—B of FIG. 6A.

FIGS. 5 and 6 show, respectively, the sound grooves for vibrations in the horizontal direction and in the vertical direction. FIGS. 5 and 6 are respectively plan views, FIGS. 5A and 6A are sectional views taken along the radial direction of the phonograph record, and FIGS. 5B and 6B are sectional views taken along the center lines A—A and B—B, respectively, of the groove, which bisect the groove.

FIG. 7 shows that spheres with different radii roll in the recorded groove. The spherical surface of a stylus' having the same radius $rt$ of the spherical surface of the tip end as the radius of curvature $pm$ in the recorded groove, has a locus which is traced along the line $t1$, while the locus of the spherical surface with half the radius of curvature $pm$ is shown along the line $t2$. Consequently, according to the decrease in the radius of the tip end spherical surface of the stylus, the trace thereof also corresponds approximately to the recorded waveform.

Figure 8:
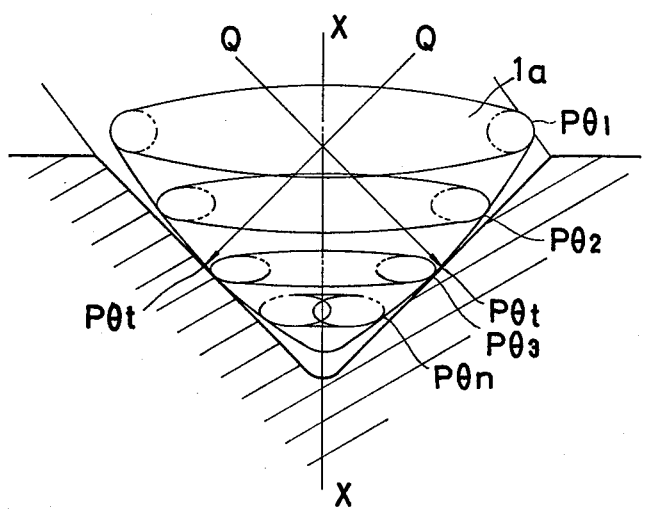
FIG. 8 is a perspective view of the stylus of the present invention as engaged in a record groove shown in section.

FIG. 8 is a perspective view of the stylus embodying the present invention, showing operative portions $P\theta_1$ to $P\theta_n$ of the stylus $1a$, which, contact or possibly contact the surface of grooves, positioned on the curvature having the center of curvature Q. X—X is the center axis of the stylus $1a$ and the closed curved lines through the points $P\theta_1, P\theta_2, \ldots P\theta_n$ indicate respective cross-sections taken along the plane perpendicular to the axis of the stylus. The opposite sides, with respect to the axis X—X of the stylus, are shown as symmetrical, but such shape is not necessarily limited so long as the conditions explained hereinafter are satisfied.

Figure 9:
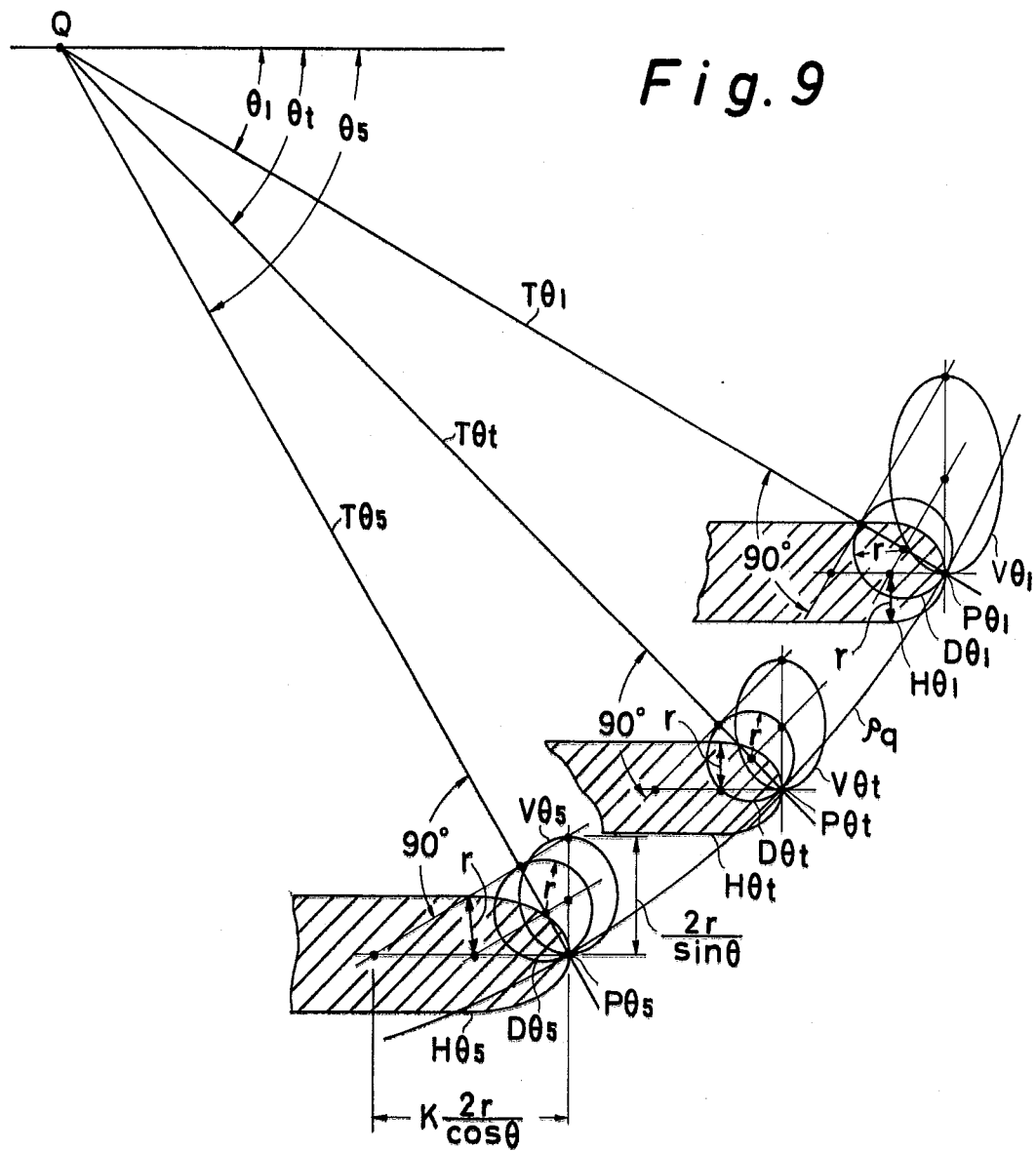
FIG. 9 is a diagrammatic view showing the radii of curvature, respectively, in sections taken along the planes $T\theta$, and the projections thereof onto the horizontal plane H$\theta$ and the plane V$\theta$ perpendicular to the plane of the record.

To consider the operative portion which contacts or possibly contacts the surface on one side of the grooves, FIG. 9 shows geometrically the shapes at three representative points of $P\theta_1$ to $P\theta_n$ by using projection drawings. In FIG. 9, the direction perpendicular to the paper is the forward direction of the record groove or grooves and the direction laterally of the paper and in the plane thereof is the radial direction of the record disk. In FIG. 9, arc $\rho_q$ having the center Q of radius of curvature represents the line joining points $P\theta_1$ to $P\theta_n$, and is equivalent to the section taken along the vertical plane through the axis of the stylus. Taking an optional point $P\theta$ to consider the shape of the operative or groove engaging portion of the stylus, the plane which includes the line connecting the center Q and the point $P\theta$, and which is parallel to the circumferential direction of the grooves, is indicated at $T\theta$. In FIG. 9, $D\theta$ designates a circle or an ellipse which indicates the cross-sectional shape of the arcuate edge of the operative portion of the stylus in the plane $T\theta$. Stated another way, this arcuate edge is part of a circle or part of an ellipse. In any particular section $T\theta$, all of the sections $D\theta$ are the same, that is, they are either all circles or all ellipses. FIG. 9 represents the particular case in which $D\theta$ is a circle. Thus, in FIG. 9, $D\theta_1$ to $D\theta_n$ represent circles or ellipses of which the curvature of the arcuate edges of the operative portion of the stylus, at the respective points $P\theta_1$ to $P\theta_n$, are part.

When the sections $D\theta$ are projected from the respective planes $T\theta$, perpendicular to the planes $T\theta$ onto a plane $H\theta$ which is perpendicular to the axis of the stylus. the projected sections are indicated at $H\theta_1$ to $H\theta_n$ which represent the projected images, respectively, of $D\theta_1$ to $D\theta_n$. As is apparent from the drawing, $H\theta_x$ is always an ellipse having a major diameter in the radial direction of the record and a minor diameter in the forward direction of the grooves. Projections $H\theta_x$ are defined as follows.

The minor diameter of the ellipse is $2r$, the length of which is two times the radius $r$, of the arcuate edge of the operative portion of the stylus, adequate to reproduce recorded signals in the record disc, and the major diameter becomes, assuming that the angle formed by the plane $T\theta$ and the plane $H\theta$ is $\theta$, $$K\, 2r/\cos\theta \ldots (7)$$

in which $K \geq 1.0$.

On the other hand, the projections $D\theta_1$ to $D\theta_n$ onto the vertical plane $V\theta$, perpendicular to the horizontal plane $H\theta$, are shown respectively by $V\theta_1$ to $V\theta_n$ in FIG. 9. Similarly, the projected image $V\theta_x$ becomes an ellipse, the major diameter of which is given by $$2r/\sin\theta \ldots (8)$$

Each ellipse always has its major diameter on the line connecting $P\theta$ and the center Q and, on the case of circles, $k = 1.0$. Considering the projection onto the plane $H\theta$ in a direction perpendicular to the respective plane $T\theta$ or the section of an edge portion of the operative portion of the stylus in the plane $H\theta$, the projected shape is necessarily an elliptical shape, whose major diameter increases with the increase of the angle $\theta$, but whose minor diameter remains constant. In the projected shape, the major diameter extends laterally, that is, on the line including the central axis of the stylus and the point $P\theta$. The minor diameter of the projected section is $2r$. In the case of circles, the diameter is $r$.

Thus the direction of the major diameter is the vertical direction, and also the minor diameter $2r$ is disposed in the direction parallel to the forward direction of the groove. In FIG. 9, since the horizontal projected image $H(45° - \alpha)$ with respect to $\theta$ of 45° is the same as the vertical projected image $V(45° + \alpha)$, and since the vertical projected image $V(45° - \alpha)$ is the same as the horizontal projected image $H(45° + \alpha)$, the same acoustic reproduction for components both of horizontal vibrations and also of vertical vibrations is obtainable.

As will be seen from the above explanation, the radii of curvature in the planes $H\theta$ and $V\theta$, respectively, at the contact point $P\theta$ are not larger than $r$. In other words, it may be resolved by the major diameters of $H\theta$ and $V\theta$ being larger than $2r$. In this case, the coefficient K is made larger than 1.0 inclusive thereof, that is, $K \geq 1.0$.

Explained hereinbefore the shape of the operative portion in the present invention is by using the projections but the respective sections, in FIG. 9, taken along the vertical plane $V\theta$ and the horizontal plane $H\theta$ are substantially the same in the radii of curvature at the respective points $P\theta$ as those of the projected images of $V\theta_x$ and $H\theta_x$ in FIG. 9, respectively. Therefore, all the above explanation may be applied also to the sections so that a shape having good acoustic reproduction characteristics is obtainable.

Although FIG. 9 shows the curvature of the points $P\theta_1$ to $P\theta_n$ as based on one center Q, a plurality of center points may be used, the tracing of which may form a plurality of points, continuous of discontinuous straight lines, or curved lines, so long as the tip portion of the stylus does not contact the bottom portion of the sound grooves. The positions of the centers Q for opposite operative portions are not particularly limited as far as the above conditions are satisfied, for example, on the same plane or even not the same plane. The cross-sectional shape of the stylus has a general form of an ellipse, similar to the sections shown in FIGS. 2A, 2B and 2C. All the shapes as mentioned hereinbefore are, taking into consideration the acoustic reproduction characteristics of the record in every status, required to have a length in the axial direction of the stylus larger than the maximum depth of the modulated sound grooves.

Figure 10:
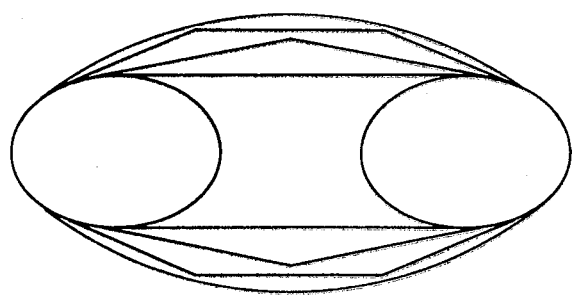
FIG. 10 is a view showing the different horizontal sections which the stylus shown in FIG. 8 may take.

The horizontal sectional shapes are shown in FIG. 10 in which are operative portions may be connected with any lines, for example curved lines, polygonal lines and straight lines, which are all tangent to the ellipse.

While specific embodiments of the invention have been shown and described in detail to illustrate the application of the principles of the invention, it will be understood that the invention may be embodied otherwise without departing from such principles.

What is claimed is:

1. A reproducing stylus for phonograph records having an operative tip portion, with a central axis substantially perpendicular to the direction of travel along a sound groove of a record, said tip portion being formed, on lower and laterally opposite surfaces of the stylus, with arcuate edges designed to contact the walls of a sound groove in a record disk, said operative tip portion having a substantially elliptical cross-section elongated perpendicular to the direction of travel of the stylus along a sound groove; the groove-contacting portions of said operative tip portions following a curved contour line, in a section taken in a plane perpendicular to such direction of travel and including the central axis of said stylus and passing through the stylus tip, which is an arc of a circle having a center of curvature Q located in said plane; the arcuate edges of said operative tip portion tangent to and centered on said contour line, in all sections D$\theta$ thereof in a plane T$\theta$, including any point P$\theta$ thereof on said curved contour line and including said center of curvature Q, and which plane T$\theta$ is perpendicular to a plane including said point P$\theta$ and said central axis of said stylus, being portions of identical ellipses; the projections of said arcuate edges in said plane T$\theta$, projected, perpendicular to said plane T$\theta$, onto a plane H$\theta$ perpendicular to said central axis of said stylus, forming part of respective ellipses having the same minor diameter and whose major diameter is $$k \cdot (2r/\cos\theta)$$

where $\theta$ is the angle formed by said planes T$\theta$ and H$\theta$, said minor diameter is $2r$, and $k \geq 1.0$.

2. A reproducing stylus, as claimed in claim 1, wherein the projections of said arcuate edges in said plane H$\theta$ perpendicular to said central axis of said stylus and in a plane perpendicular to said plane T$\theta$, relative to said central axis of said stylus, at points of said operative portions spaced equi-angularly from a plane at an angle $\theta$ of 45°, are the same, respectively, in the horizontal section at one point and in the vertical section at the other point, whereby the curvature at any point P$\theta$ is always constant for vibrations at 45° and irrespective of the inclination of said stylus.

3. A reproducing stylus, as claimed in claim 1, wherein the sectional shape of the operative portion, in a plane perpendicular to the axis of the stylus, is part of an ellipse in which the radii of curvature of the edges are the same.

4. A reproducing stylus as claimed in claim 1, wherein the center Q of the radius of curvature is positioned over the operative portion of the styus and on the side of the stylus axis opposite from the operative portion.

5. A reproducing stylus, as claimed in claim 1, wherein the operative portion has a single radius of a curvature.

6. A reproducing stylus, as claimed in claim 1, wherein centers Q for opposite operative portions are both positioned in the same plane.

7. A reproducing stylus, as claimed in claim 6, wherein the radii of curvature for the operative portions are the same.

8. A reproducing stylus, as claimed in claim 1, wherein center Q for opposite operative portions are disposed, respectively, in a position over the operative portions and on the sides of the central axis of said stylus remote from the respective operative portions and in the same plane.

9. A reproducing stylus, as claimed in claim 8, wherein the section in the horizontal plane within the operative portion has a shape such that the edge portions of the operative portions are connected with curved lines tangent thereto.

10. A reproducing stylus, as claimed in claim 8, wherein the section in the horizontal plane within the operative portion has a shape such that the edge portions of the operative portions are connected with polygonal lines tangent thereto.

11. A reproducing stylus, as claimed in claim 8, wherein the section in the horizontal plane within the operative portion has a shape such that the edge portions of the operative portions are connected with straight lines tangent thereto.

* * * * *